Jan. 30, 1962

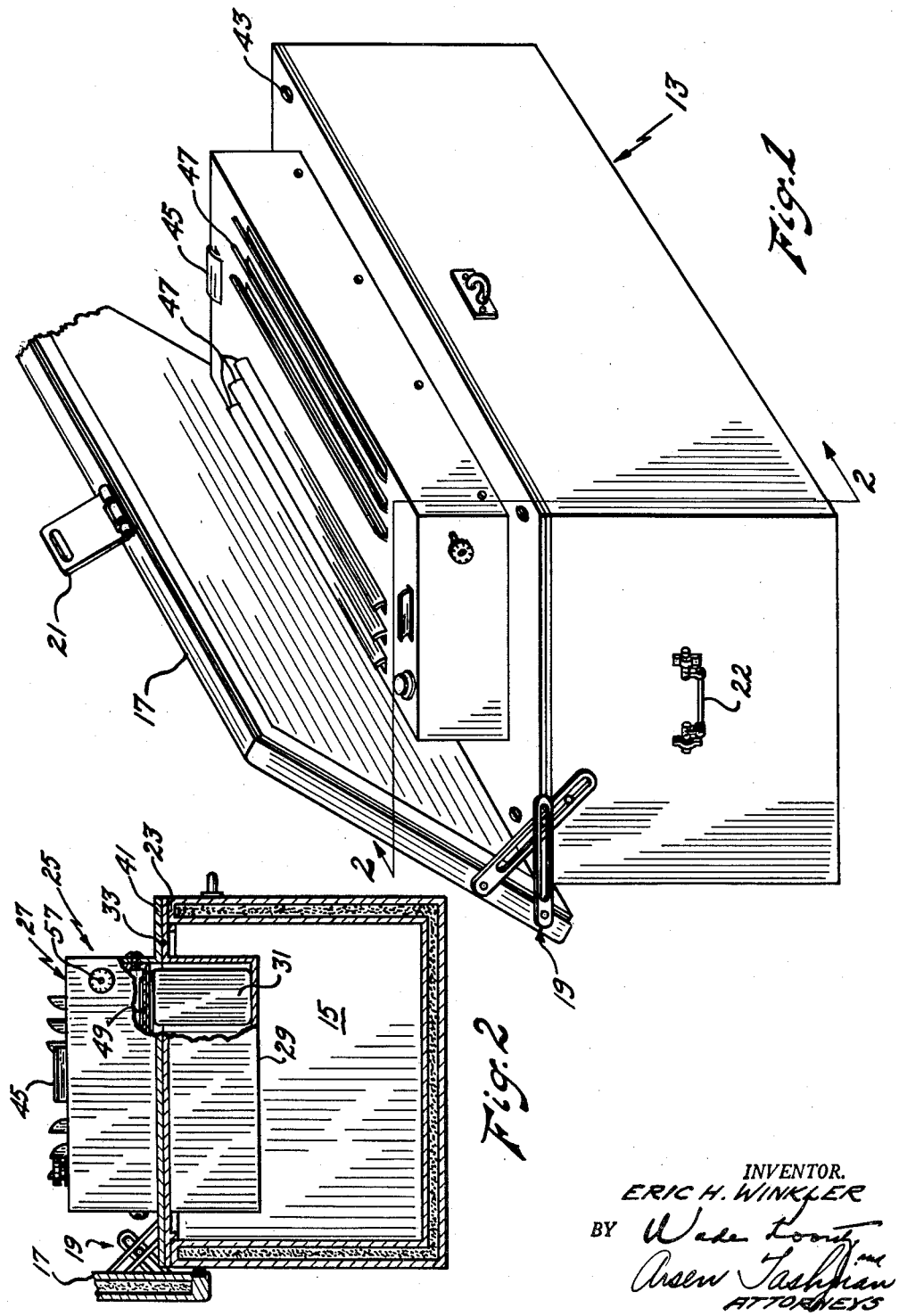

E. H. WINKLER 3,018,638

PORTABLE REFRIGERATION APPARATUS

Filed Nov. 13, 1959

INVENTOR.
ERIC H. WINKLER
BY
ATTORNEYS

Jan. 30, 1962  E. H. WINKLER  3,018,638
PORTABLE REFRIGERATION APPARATUS
Filed Nov. 13, 1959  3 Sheets-Sheet 3
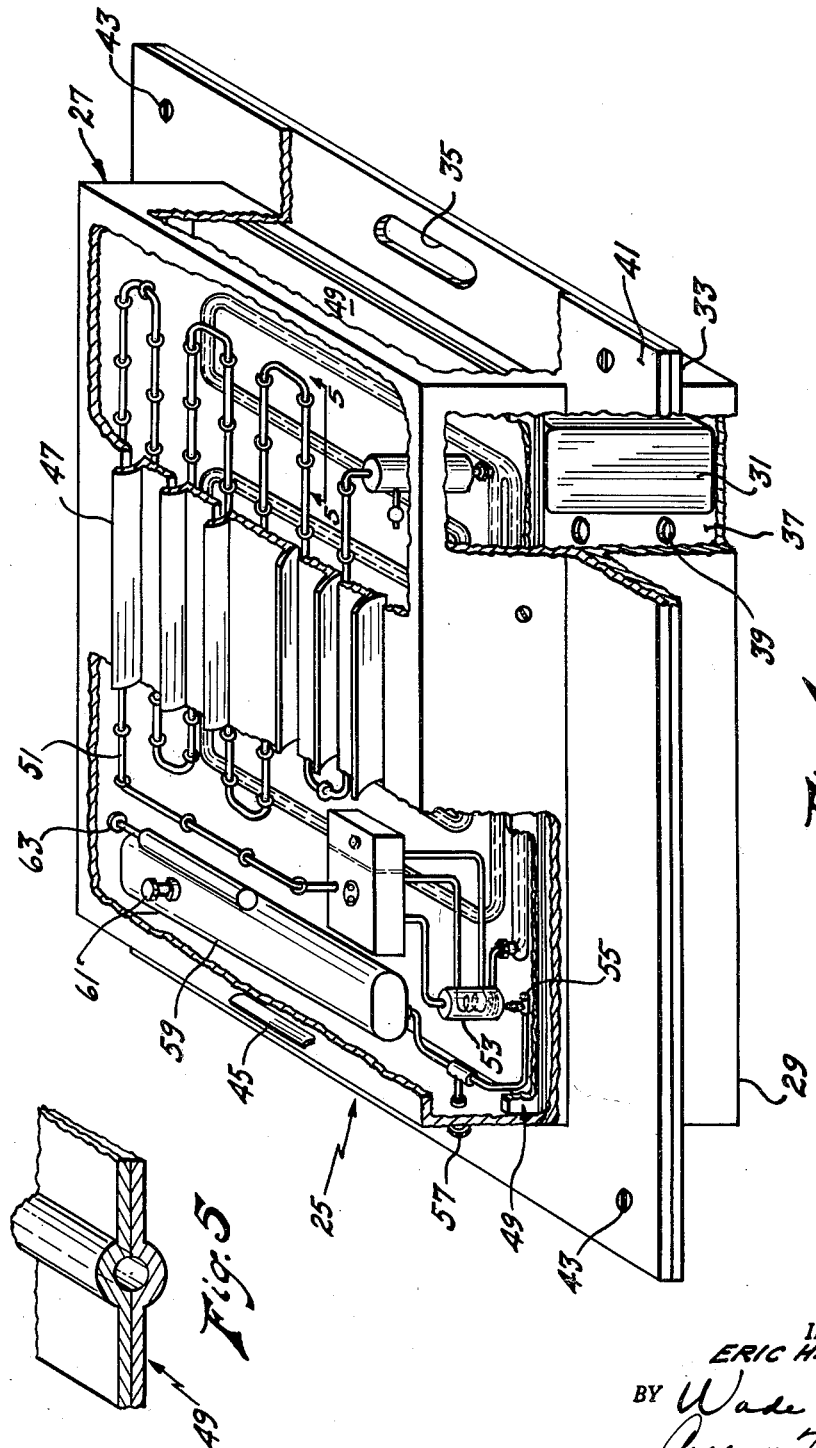
INVENTOR.
ERIC H. WINKLER
BY Wade Koontz
Arsen Tashjian
ATTORNEYS

United States Patent Office 3,018,638
Patented Jan. 30, 1962

3,018,638
PORTABLE REFRIGERATION APPARATUS
Eric H. Winkler, 1004 Elm St., Rome, N.Y.
Filed Nov. 13, 1959, Ser. No. 852,917
5 Claims. (Cl. 62—237)
(Granted under Title 35, U.S. Code (1952), sec. 266)

The invention described herein may be manufactured and used by or for the United States Government for governmental purposes without payment to me of any royalty thereon.

This invention relates to portable absorption type refrigeration equipment and more particularly is concerned with providing a truly portable refrigerator which includes a removable self-powered refrigerating mechanism adapted to be placed over the top of an insulated receptacle holding containers of refreezable refrigerant. The refrigerating mechanism may be removed after the refreezable refrigerant has frozen and an insulated lid is then placed on the receptacle, the frozen refrigerant containers maintaining the interior of the receptacle at the desired cold temperature allowing another receptacle to be cooled by using the same refrigerating mechanism.

Very often it is necessary to transport and store perishable goods such as comestibles, antibiotics, medicines, film for cameras and other things which are likely to spoil or deteriorate upon prolonged exposure to heat. Present field methods for preventing early spoilage are generally inadequate in many respects. Actually in many instances, the refrigeration systems now used are not truly portable in the sense that an outside power source is necessary to keep the system in operation when preservation for extended periods of time is required. Normally, any prolonged interruption of power will cause the system to fail and deterioration of the contents of the refrigerator receptacle will result. It would be desirable to provide an efficient regfrigeration system which would not require that a permanent power source be available in order to maintain low temperatures.

Accordingly, it is an object of the present invention to provide portable refrigeration apparatus which includes a self contained power generator.

Another object of the invention is to provide a portable refrigeration system which is adaptable for use with small portable insulated boxes.

Still another object of the invention is to provide an insulated box containing cans of refreezable refrigerant which can be frozen by a portable refrigerating mechanism. The mechanism may be subsequently removed allowing the frozen refrigerant cans to maintain cold temperatures in the insulated box.

Another object of the invention is to provide a single refrigerating mechanism which is adaptable for use with a plurality of insulated boxes containing cans of refreezable refrigerant therein. The refrigerating mechanism is ordinarily operated tor sufficient time to freeze the refreezable refrigerant and then removed and the process is repeated with another insulated box.

Still another object of the present invention is to provide a safer means for transporting refrigerated goods by eliminating the necessity of operating the refrigerating mechanism during transportation. The frozen cans of refreezable liquid act to retain the low temperature in the insulated box thereby making constant operation of the mechanism unnecessary and making a safer apparatus by eliminating certain gaseous dangers accompanying absorption type refrigeration systems.

A still further object of the present invention is to provide a refrigeration unit and insulated box which are separate items making storing and handling during transit safer and more convenient.

These and other objects, features and advantages will become more apparent from the following description taken in conjunction with the accompanying drawings wherein:

FIG. 1 is an isometric view of portable refrigeration apparatus constructed according to the present invention;

FIG. 2 is a cross sectional view taken along the line 2—2 of FIG. 1;

Figure 3C:
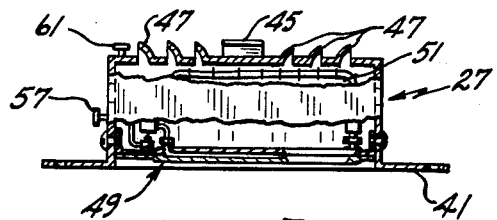
Figure 3B:
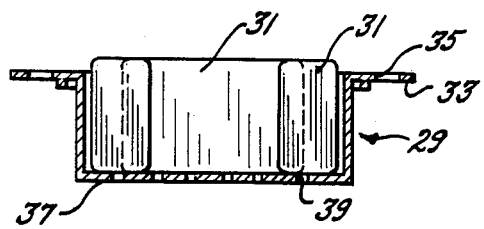
Figure 3A:
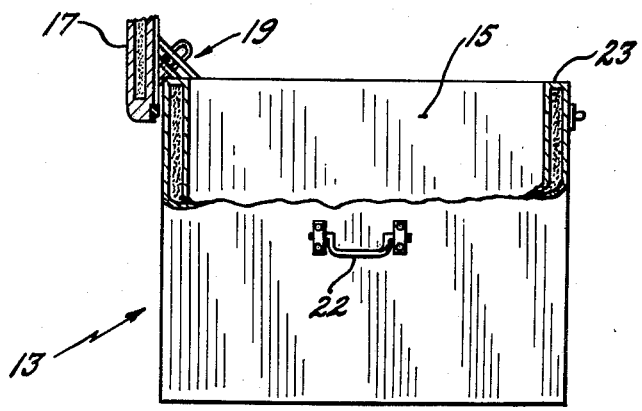

FIGS. 3a, 3b, and 3c are exploded elevation views partially in section showing the relative locations of the elements of the apparatus;

FIG. 4 is a fragmentary detailed isometric view of the absorption type refrigeration unit with sections partly broken away to show the placement of the various parts of the unit; and FIG. 5 is a view taken along the line 5—5 of FIG. 4 showing a typical cross-section of the evaporator plate which includes a tubular cavity through which the refrigeration gas flows.

Referring now to the drawings in which like reference characters are used to refer to like parts throughout the specification, the invention includes an insulated receptacle designated generally by the reference character 13. The receptacle 13 includes a storage portion 15 in which the perishable material is stored and a lid 17 which may be attached to the storage portion 15 by means of hinge 19. A suitable latch 21 is provided to retain the lid 17 in closed position. The entire receptacle 13 is completely insulated to prevent heat transfer between the inside of the receptacle and outside atmosphere. This is accomplished in the usual manner by providing spaced inner and outer walls having an insulating material therebetween. The walls may be of metal, wood, plastic or any relatively strong, thin material. A pair of handles 22 are provided for grasping the receptacle 13 so that it may be conveniently carried by two persons or hoisted onto a transport vehicle by a mechanical crane.

At the top edge of the storage portion 15 of the receptacle, a shoulder 23 is formed which acts as a support for a self-powered refrigeration unit 25. The refrigeration unit 25 is divided into two sections, a top section 27 containing the refrigerating mechanism and a bottom section 29 for holding containers 31 of a refreezable refrigerant.

A detailed view of the refrigeration unit 25 is shown in FIG. 4. The bottom section 29 is held in place in the insulated receptacle 13 by engaging a lip 33 with the shoulder 23 of the receptacle or insulated box 13. The depth of the bottom section 29 is such that the containers of refreezable refrigerant are held firmly in place when the lid 17 is closed and latched. The lip 33 which extends around the periphery of the bottom section 29 may be adjustable for universal use in various size insulated boxes. Lift-out holes 35 are located at various points on the lip 33 to allow convenient removal of the bottom section 29 when it is necessary to enter the insulated box 13 for materials. The bottom plate 37 of the bottom section 29 is provided with air vents 39 to allow passage and circulation of cold air between the frozen refrigerant containing bottom section 29 and the storage portion 15 of the insulated box 13.

The top section 27 of the refrigeration unit 25 forms a container to house the refrigerating mechanism. A top lip 41 is formed around the periphery of the top section 27 and lies adjacent to the lip 33 and is attached thereto by the fasteners 43. As shown in FIG. 2, the top section 27 is placed over the bottom refreezable refrigerant section 29 for the purpose of freezing the refreezable refrigerant containers 31. During this period the lid 17 of the receptacle 13 is open and it is desirable to affect a reasonably good seal between the top and bottom lips by a suitable gasket (not shown) so that a minimum of cold air will escape from the receptacle 13. A pair of handles 45 are formed on the top of the top section 27 so that it can be lifted off the bottom section 29 and also serve to release some of the hot air from the refrigerating unit 25. Additional hot air vents 47 are pressed or punched out to carry away more of the hot air. Protrusions extending somewhat above the top of the top section 27 are considered desirable in order to prevent blockage of the venting system by articles which may be placed upon the top section.

From the drawings, particularly FIG. 4, it can be seen that the various elements of the refrigeration unit 25 contained in the top section 27 are placed in certain ideal relative positions so as to take advantage of the physical laws involved. It is not intended that a complete coverage of the principles of the standard absorption refrigeration process be outlined in this specification. However, many advantages of a functional nature are achieved by the layout shown and described herein. The refrigerating mechanism as shown in FIG. 4 and contained within the top section 27 includes the elements of an absorption process refrigerator as well as a power generating unit. The various elements are placed such that they function most efficiently based on certain physical laws involved. The evaporator plate 49, since it is used to freeze the refreezable containers 31, is placed so as to be in physical contact therewith when the top and bottom sections of the refrigeration unit 25 are assembled. Since cold air seeks the lowest point, both the refreezable containers 31 and the evaporator plate 49 are located at the bottom of the entire unit, with the evaporator plate 49 being located above the containers 31.

The air-cool condenser line 51, where the absorption gas is condensed, is located at the top of the unit where it can readily dissipate the heat without the heat detrimentally affecting the operation of the other elements within the unit. The generator 53 and the flame or burner 55 are located on one side of the unit for operational convenience such as for lighting the burner 55 and adjustment of the fuel valves 57. The fuel tank 59 is located close to the burner 55 near the top corner of the top section 27 in order to allow for extension of the fuel valve 57 as well as the tank fill 61, and pump control 63 through the wall of the top section 27. The remaining space between the condenser line 51 and the evaporator plate 49 is used to house other elements such as a rectifier and analyzer (not shown) which are required in absorption refrigeration systems where ammonia and hydrogen type gases are used in place of solid or absorbing type of refrigerant.

The refrigeration apparatus herein described may be used as a separate but complete unit for use with presently manufactured top loading type insulated boxes such as those sold for camping purposes. Also, the system may be used as an integral refrigeration and insulated unit. A further application of the refrigeration system contemplates use as a semi-refrigeration unit where the flame, which is used for generation purposes, is obtained from a separate heating unit, as for example, a gasoline or butane cook stove used by campers.

It will be obvious, especially to those skilled in the art, that certain changes and modifications may be made in the invention as described. For example, the receptacle or insulated box may take many forms and be manufactured from a variety of materials or the containers of refreezable refrigerant may be permanently affixed to the bottom section. Likewise the details of construction and relative size, shape and location of the various elements may also vary without departing from the true spirit and scope of the appended claims.

What I claim is:

1. Portable refrigeration apparatus for use with an insulated receptacle comprising, a refrigeration unit having separable top and bottom sections, refrigerating mechanism including an evaporator plate disposed in said top section, a plurality of containers of refreezable refrigerant disposed in said bottom section in close proximity to the evaporator plate of said top section, a pair of corresponding lips on said top and bottom sections constructed and arranged to engage a shoulder on the upper edge of the insulated receptacle, the lip on said top section being separable from the lip on said bottom section to allow removal of the mechanism containing top section from the refrigerant containing bottom section, and insulating lid means for covering the refreezable refrigerant containers in a frozen state in said bottom section to retard heat transfer from outside said receptacle.

2. The portable refrigeration apparatus described in claim 1 wherein the refrigerating mechanism disposed in the top section of the refrigeration unit is of the absorption type energized by heat in the form of a flame produced by a burner, said burner being supplied with fuel from a self contained fuel system.

3. Portable refrigeration apparatus for cooling and maintaining stored material at a low temperature comprising, a receptacle for holding said stored material, said receptacle being provided with insulated walls and bottom and having an open upper end, a refrigerating unit having separable top and bottom sections, said refrigerating unit being constructed and arranged to be removably placed over the open end of said storage receptacle, a plurality of containers of refreezable refrigerant disposed in the bottom section of said refrigerating unit, an absorption type refrigeration mechanism disposed in the top section of said refrigeration unit, said refrigeration mechanism including an evaporator plate positioned at the bottom of the top section substantially in contact with the containers of refreezable refrigerant in the bottom section, said top section being separable and removable from said bottom section after the containers of refrigerant are frozen, and insulated lid means for preventing rapid heat transfer between the atmosphere and the interior of said storage receptacle.

4. In a portable refrigerator including a storage receptacle of rectangular formation, insulated side walls and insulated bottom, a shoulder provided on the top edge of said insulated side walls, a refrigeration unit having lip portions dimensioned to rest on said shoulders, said refrigeration unit including separable top and bottom sections, refrigeration mechanism disposed in said top section, containers of refreezable refrigerant disposed in said bottom section, an insulated lid dimensioned to be substituted for said top section after said containers of refreezable refrigerant have been frozen allowing the storage receptacle to operate as a refrigerator without connection to any energy source.

5. The portable refrigerator described in claim 4 wherein said refrigeration mechanism is of the absorption type thermally energized by a flame generated by a burner, said burner being fed from a fuel source.

References Cited in the file of this patent

UNITED STATES PATENTS

| | | |
|---|---|---|
| 1,983,056 | Teichmann | Dec. 4, 1934 |
| 2,016,377 | Krotzer | Oct. 8, 1935 |
| 2,033,554 | Smith | Mar. 10, 1936 |
| 2,462,115 | Luecke | Feb. 22, 1949 |
| 2,483,100 | Morrison | Sept. 27, 1949 |
| 2,585,360 | Williams | Feb. 12, 1952 |
| 2,694,297 | Shoemaker | Nov. 16, 1954 |
| 2,781,643 | Fairweather | Feb. 19, 1957 |